United States Patent
Gentry et al.

(10) Patent No.: US 8,543,967 B2
(45) Date of Patent: Sep. 24, 2013

(54) COMPUTER SYSTEM AND METHOD FOR DETERMINING A TEMPERATURE RISE IN DIRECT CURRENT (DC) LINES CAUSED BY JOULE HEATING OF NEARBY ALTERNATING CURRENT (AC) LINES

(75) Inventors: Jason T. Gentry, Windsor, CO (US); Brian C. Miller, Fort Collins, CO (US); William S. Burton, Fort Collins, CO (US); M. Jason Welch, Fort Collins, CO (US); Richard A. Krzyzkowski, Fort Collins, CO (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 13/405,059

(22) Filed: Feb. 24, 2012

(65) Prior Publication Data
US 2013/0227508 A1    Aug. 29, 2013

(51) Int. Cl.
*G06F 17/50*    (2006.01)
(52) U.S. Cl.
USPC ........... 716/136; 716/106; 716/109; 716/110; 716/111
(58) Field of Classification Search
USPC .......................... 716/106, 109, 110, 111, 136
See application file for complete search history.

(56) References Cited

U.S. PATENT DOCUMENTS

| | | | | |
|---|---|---|---|---|
| 6,532,570 | B1* | 3/2003 | Mau | 716/130 |
| 6,857,113 | B2* | 2/2005 | Gentry et al. | 716/113 |
| 7,124,380 | B2* | 10/2006 | Keller et al. | 716/112 |
| 7,155,686 | B2 | 12/2006 | Hou et al. | |
| 7,248,524 | B2* | 7/2007 | Nordal et al. | 365/213 |
| 7,388,395 | B2 | 6/2008 | Kang et al. | |
| 2008/0098270 | A1 | 4/2008 | De Ceuninck | |
| 2009/0187869 | A1 | 7/2009 | Jain et al. | |
| 2010/0258335 | A1* | 10/2010 | Arvin et al. | 174/126.2 |
| 2012/0136599 | A1* | 5/2012 | Inui | 702/65 |
| 2012/0187558 | A1* | 7/2012 | Arvin et al. | 257/737 |
| 2012/0317529 | A1* | 12/2012 | Agarwal et al. | 716/113 |

OTHER PUBLICATIONS

Sven Rzepka, Kaustav Banerjee, Ekkehard Meusel and Chenming Hu, Characterization of Self-Heating in Advanced VLSI Interconnect Lines Based on Thermal Finite Element Simulation, Journal, Sep. 3, 1998, p. 406-411, vol. 21, No. 3, IEEE.

* cited by examiner

*Primary Examiner* — Sun Lin

(57) ABSTRACT

A computer system performs a verification process that quickly and efficiently determines a temperature rise of DC conductor lines of an IC design caused by Joule heating in nearby AC conductor lines of the IC design, and whether the temperature rise is acceptable in terms of an electromigration performance of the IC design.

32 Claims, 8 Drawing Sheets

COMPUTER SYSTEM AND METHOD FOR DETERMINING A TEMPERATURE RISE IN DIRECT CURRENT (DC) LINES CAUSED BY JOULE HEATING OF NEARBY ALTERNATING CURRENT (AC) LINES

TECHNICAL FIELD OF THE INVENTION

The invention relates to integrated circuits (IC) design. More particularly, the invention relates to a computer system and a method for quickly and efficiently determining a temperature rise in direct current (DC) conductor lines due to Joule heating of nearby alternating current (AC) conductor lines.

BACKGROUND OF THE INVENTION

The process of building ICs includes physical implementation of an IC design followed by verification of the IC design. During the verification process, a verification tool performs a large number of analyses to determine whether the physical IC design meets certain constraints. One such verification analysis is an electromigration analysis. Electromigration is the displacement of material caused by the gradual movement of ions in the material due to a momentum transfer between the electrons flowing through the material and the atoms that make up the material. Over time, electromigration may result in electrical short circuits and/or electrical open circuits in the material. The electromigration verification analysis is performed to determine whether conductor lines in the IC design will meet electromigration performance criteria.

As electrical AC current flows through AC conductor lines in an IC, the AC conductor lines heat up, which is an effect commonly referred to as Joule heating. The physical and geometric properties of the dielectrics and of the electrical conductors used in the manufacturing process limit the amount of heat that can be dissipated by those elements. Joule heating that is not adequately dissipated results in temperature rises in the IC that can detrimentally impact the electromigration performance of the conducting structures under evaluation and any adjacent conducting DC structures. In essence, Joule heating exacerbates electromigration.

The goal of the electromigration verification analysis is to determine whether Joule heating will degrade electromigration performance to an impermissible level. Unless a detailed thermal analysis fully representative of the three-dimensional aspects of the complete IC design is performed, it is very difficult to accurately estimate the temperature increase that will result and the extent to which it will affect electromigration performance. As a result, a simplified thermal analysis is sometimes employed during the verification process. The simplest such thermal analysis models each conductor line as a single line of unlimited length. In this type of analysis, a maximum line temperature rise is chosen as acceptable for the conductor line and the associated AC current needed to cause that rise is allowed for each conductor line in the design.

This simple thermal analysis has limitations. In particular, because of the low accuracy of the solution, it requires that the electromigration data be interpreted very conservatively. The analysis assumes that each conductor line reaches its maximum temperature and that all other conductor lines have also reached their maximum temperatures. Interpreting the electromigration data this conservatively can result in over-design penalties, in terms of both design cost and performance.

A known alternative to the simple thermal analysis is to analyze the full three-dimensional IC design for Joule heating of electrical routes to solve for the thermal profile in aggregate. Typically, such thermal solution formulations are simplified into lumped resistor network formulations. However, it is intractable to inject such formulations into the design cycle except in cases of designs that are very modest in size. For large designs that have hundreds of millions of conductor lines, it is generally intractable to run a full three-dimensional design thermal simulation, and even if it is possible to do so, it will likely result in wasted engineer hours and resources and lead to unacceptable project delays.

Accordingly, a need exists for a verification method that is capable of quickly and efficiently determining the temperature rise of DC conductor lines caused by Joule heating in nearby AC conductor lines in a way that avoids cost and performance penalties and unacceptable project delays.

SUMMARY OF THE INVENTION

The invention is directed to a computer system, method, and computer program for analyzing an IC design to determine whether a temperature rise caused by Joule heating in AC conductor lines of the design is acceptable. The computer system comprises a user interface, a memory subsystem, and a processor subsystem. The memory subsystem stores a representation of at least a portion of the IC design and computer code for performing a verification analysis. The processor subsystem is programmed to select a characteristic finite area in the representation having a particular shape and size and having a particular DC conductor line configuration that is repeated throughout the representation. The processor subsystem is programmed to compute a characteristic function for the selected characteristic finite area. The characteristic function characterizes a temperature rise of the selected characteristic finite area as a function of Joule heating power produced by an AC conductor line configuration of the selected characteristic finite area. For each actual finite area in the representation that has a size and shape and a DC conductor line configuration that matches the size and shape and DC conductor line configuration of the selected characteristic finite area, the processor subsystem is programmed to: calculate a total Joule heating power of the AC conductor line configuration of the actual finite area; multiply the respective total Joule heating power of each respective actual finite area by the characteristic function to calculate a respective temperature rise value for each respective actual finite area; and compare each respective temperature rise value with a predetermined threshold (TH) value to determine whether the respective temperature rise value exceeds the threshold value.

The method comprises: storing a representation of at least a portion of an IC design and computer code for performing a verification analysis in a memory subsystem of a computer system; and, in a processor subsystem of the computer system:

selecting a characteristic finite area in the representation having a particular shape and size and having a particular DC conductor line configuration that is repeated throughout the representation;

computing a characteristic function for the selected characteristic finite area;

for each actual finite area in the representation that has a size and shape and a DC conductor line configuration that matches the size and shape and DC conductor line configuration of the selected characteristic finite area:

calculating a total Joule heating power of the AC conductor line configuration of the actual finite area, applying the respective total Joule heating power of the respective actual finite area to the characteristic function to calculate a respective temperature rise value for the respective actual finite area, and comparing the respective temperature rise value with a predetermined TH value to determine whether the respective temperature rise value exceeds the threshold value.

The computer program comprises computer instructions for:

selecting a characteristic finite area in the representation having a particular shape and size and having a particular DC conductor line configuration that is repeated throughout the representation;

computing a characteristic function for the selected characteristic finite area; and for each actual finite area in the representation that has a size and shape and a DC conductor line configuration that matches the size and shape and DC conductor line configuration of the selected characteristic finite area:

calculating a total Joule heating power of the AC conductor line configuration of the actual finite area, applying the respective total Joule heating power of the respective actual finite area to the characteristic function to calculate a respective temperature rise value for the respective actual finite area, and comparing the respective temperature rise value with a predetermined TH value to determine whether the respective temperature rise value exceeds the threshold value.

These and other features and advantages of the invention will become apparent from the following description, drawings and claims.

DETAILED DESCRIPTION OF AN ILLUSTRATIVE EMBODIMENT

In accordance with the illustrative, or exemplary, embodiments described herein, a computer system is programmed to perform a verification process that quickly and efficiently determines (1) the temperature rise of DC conductor lines of an IC design caused by Joule heating in nearby AC conductor lines of the IC design, and (2) whether the temperature rise is acceptable in terms of the electromigration performance of the IC design. The method of the invention comprises the verification process performed by the computer system. An illustrative embodiment of the verification process and of the computer system that performs the verification process will now be described with reference to FIGS. 1-7.

Figure 1:
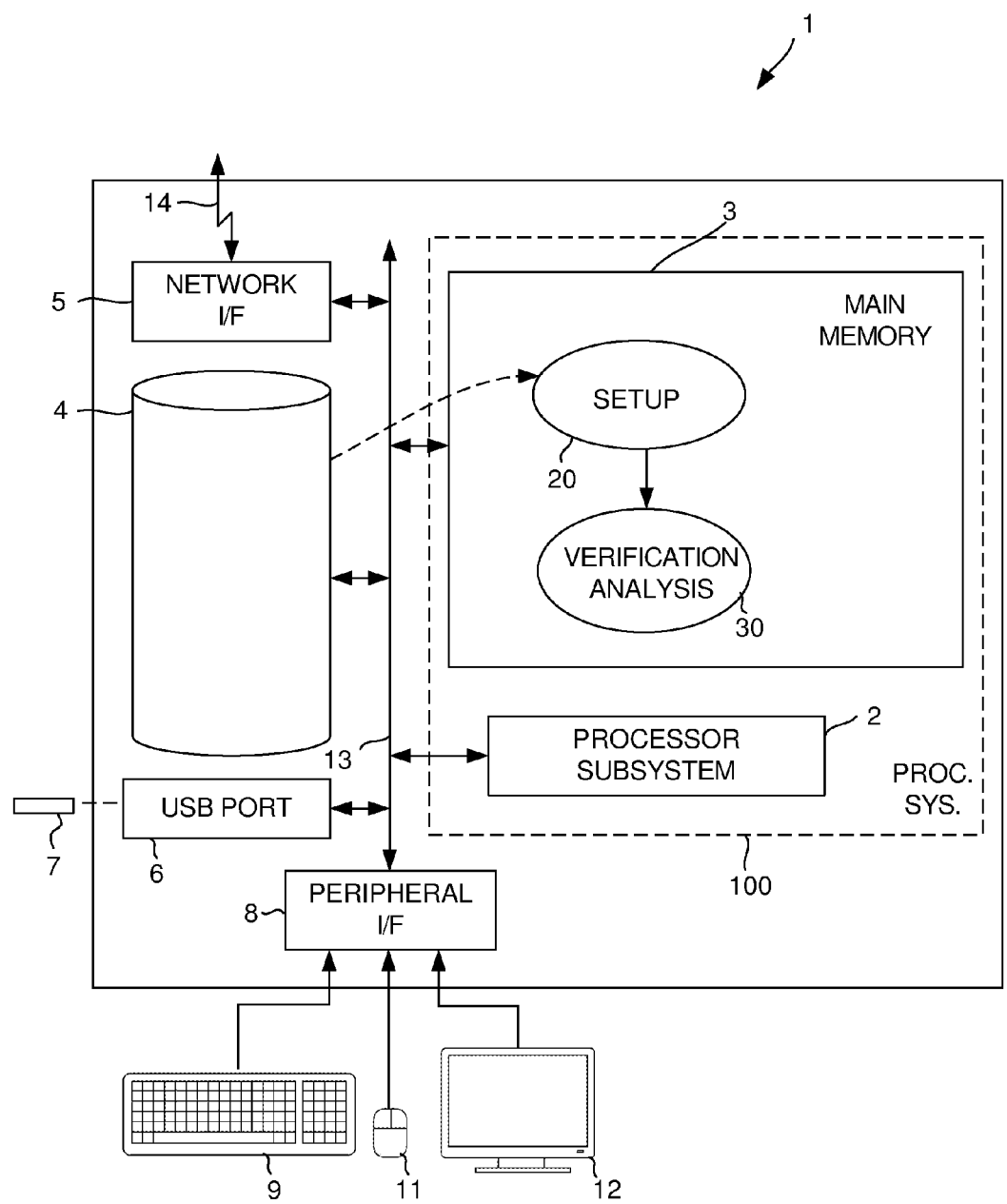
FIG. 1 is a block diagram that represents the computer system for performing the verification process in accordance with an illustrative embodiment.

FIG. 1 is a block diagram that represents the computer system 1 for performing the verification process in accordance with an illustrative embodiment. The computer system 1 may be a workstation or personal computer system that has been suitably programmed or otherwise configured, as described below in more detail. The computer system 1 may be, for example, any computer system of a type commonly used in verifying an IC design. Except for the software elements described below that perform the verification process of the invention, the computer system 1 may have a conventional structure and configuration. Accordingly, the computer system 1 includes hardware and software elements of the types commonly included in such computer systems, such as a processor subsystem 2, a memory subsystem 3, non-volatile data storage 4 (e.g., a hard disk drive, FLASH memory, etc.), a network interface 5, and one or more ports 6 for reading from and writing to external devices. Such external devices may include, for example, a removable data storage medium 7, such as a Universal Serial Bus (USB) "thumb drive."

The computer system 1 also includes a peripheral interface 8 through which data communication with a keyboard 9, a mouse 11 and a display device 12 can occur. Peripheral interface 8 can comprise USB ports of the same type as port 6 or any other suitable type of ports. In other embodiments, computer system 1 may include hardware and software elements in addition to those described herein or that are different from those described herein. The above-described elements are in communication with one another via a digital bus 13. Computer system 1 is capable of communicating with remote devices (not shown) via a network connection 14, such as a connection to the Internet, for example.

Memory subsystem 3 is generally of a type in which software elements, such as data and computer code, are operated upon by the processor subsystem 2. In accordance with conventional computing principles, the processor subsystem 2 operates in accordance with programming code, such as operating system code and application program code. In the exemplary embodiment of the invention, such application program code includes a setup element 20 and a verification analysis element 30, which will be described below in detail. Although these software elements are conceptually shown for purposes of illustration as stored in or residing in memory subsystem 3, persons skilled in the art to which the invention relates will appreciate that such software elements may not reside simultaneously or in their entireties in memory subsystem 3, but rather, may be retrieved in portions on an as-needed basis, e.g., in code segments, files, modules, objects, data structures, instruction-by-instruction, or any other suitable basis, from data storage 4 or from some other suitable source (e.g., via network connection 14).

It should be noted that although only the setup element 20 and the verification analysis element 30 are shown for purposes of clarity, other software elements of the type conventionally included in computer systems that enable them to operate properly are generally included in the computer system 1, such as operating system code and application code. It should also be noted that some or all of the software elements and data used by the computer system 1 may be stored at a location that is external to the computer system 1 and accessible thereby via the network connection 14, such as in a memory element located in network "cloud."

The combination of the processor subsystem 2, the memory subsystem 3 (or other element or elements in which software is stored or resides) and any related elements generally defines a programmed processor system 100 to which the other elements of computer system 1 are peripheral. It should also be noted that the combination of software elements and the non-transitory medium on which they are stored or in which they reside (e.g., memory subsystem 3, data storage 4, removable data storage medium 7, etc.) generally constitutes what is referred to in the patent lexicon as a "computer program product," or a "computer program article of manufacture."

In the exemplary embodiment, the verification process is a computer-implemented method that can be initiated by a person (user) who operates computer system 1. A user can operate computer system 1 locally using keyboard 9, mouse 11, display device 12, etc., or it can be operated remotely via network connection 14. In operation, and in accordance with the effects of software elements that include setup element 20 and verification analysis element 30, the computer system 1 provides a suitable user interface through which the user can interact with computer system 1. Although such a user interface is not described herein in further detail, it should be noted that, in the exemplary embodiment, a user can control the computer system 1 in a manner that causes the computer system 1 to obtain data sets (data files, databases, etc.) from, for example, data storage 4, effect the methods described hereinafter, and produce output data (data sets, data files, databases, etc.).

When the programmed processor system 100 executes the setup element 20, the setup element 20 performs a setup algorithm that selects a finite area having a configuration of one or more DC conductor lines that reoccurs, or repeats, throughout the IC design. The setup element 20 typically uses user input entered into the computer system 1 by a user who uses an input device, such as the keyboard 9 and/or the mouse 11, for example, to make the selection. The setup element 20 preferably displays candidate finite areas on the display device 12 that have been selected based on predetermined criteria that describe the types of features the finite area should have. The user then selects one of the candidate finite areas. This process of selecting a finite area could be performed automatically by the setup algorithm without the use of user input, but it is generally desirable to have the user have the final say regarding which finite area will be used for this purpose. Alternatively, the setup element 20 may have no part in selecting the finite area except for receiving user input corresponding to a selection of a finite area and designating the selected finite area as such. The phrase "selecting a finite area," as that phrase is used herein, is intended to denote any of the following cases: (1) the setup element 20 makes the selection automatically without the use of user input; (2) the setup element selects candidate finite areas based on predetermined criteria and the user makes the final selection; and (3) the user makes the selection and the setup element 20 merely designates the finite area as the selected finite area.

After the finite area has been selected, the setup algorithm calculates a characteristic function for the selected finite area that describes a temperature rise that will occur in the DC conductor line configuration as a function of the electrical power produced by Joule heating of AC conductor lines of the selected finite area. The selected finite area will be referred to hereinafter as the "characteristic finite area."

The characteristic finite area meets at least the following criteria: (1) it has a configuration of one or more DC conductor lines that is repeated throughout the IC design, or throughout at least a portion of the IC design that is being verified for electromigration performance; and (2) it includes at least a portion of at least one AC conductor line. The term "AC conductor line," as that term is used herein, denotes any conductor line in the IC design that carries an electrical signal that alters between a logical high state and a logic low state. Thus, any data signal line and any clock signal line of the IC design will typically be an AC conductor line within the meaning of the invention. The term "DC conductor line," as that term is used herein, is intended to denote any conductor line of the IC design that is not an AC conductor line, such as, for example, conductor lines belonging to the power grid of the IC design.

The characteristic finite area that is selected for this purpose may be a two-dimensional or a three-dimensional area. The term "two-dimensional area," as that term is used herein, means that the area is within a single layer of the IC design. The term "three-dimensional area," as that term is used herein, means that the area is within multiple layers of the IC design.

Preferably, the characteristic finite area that is selected is an area having a configuration of AC conductor lines that corresponds to a worst case Joule heating arrangement, which, in turn, will result in a worst case temperature rise in at least one victim DC conductor line of the characteristic finite area. The reasons for using the worst case scenario are described below in more detail.

The characteristic function may be any function that relates the Joule heating power produced by the configuration of AC conductor lines of the characteristic finite area to the temperature rise of a victim DC conductor line of the characteristic finite area. The characteristic function may be a linear or nonlinear function, but preferably is a linear function to reduce computational complexity. Thus, the characteristic function preferably is a linear equation that expresses the temperature rise, $\Delta T$, of a victim DC conductor line of the characteristic finite area as a function of the total Joule heating power, P, produced by the configuration of AC conductor lines of the characteristic finite area. More preferably, the characteristic function is a linear equation that expresses the worst case temperature rise, $\Delta T_{WC}$, of a victim DC conductor line of the characteristic finite area as a function of the worst case total Joule heating power, $P_{WC}$, produced by the worst case configuration of AC conductor lines of the characteristic finite area.

Figure 2:
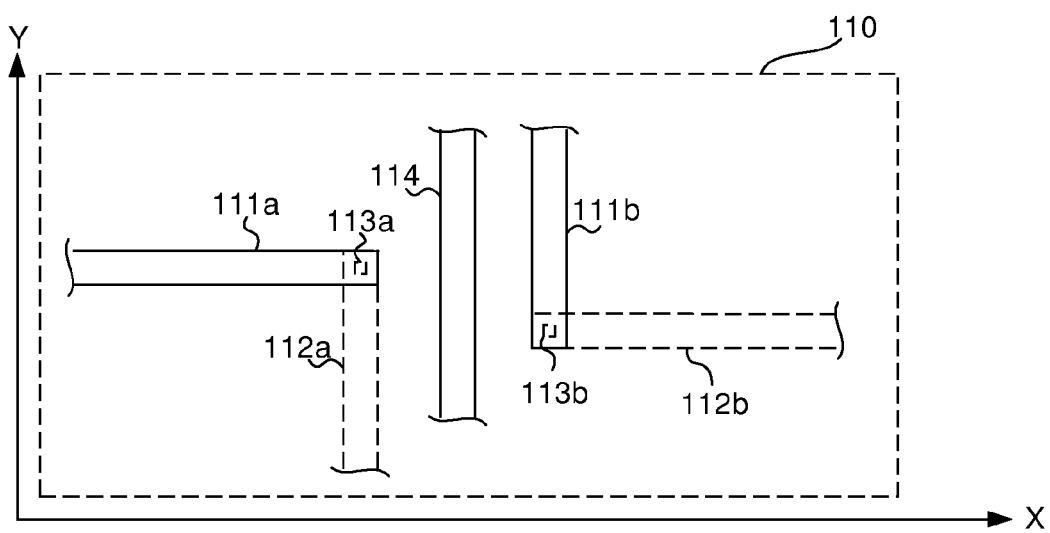
FIG. 2 is a block diagram of an exemplary, or illustrative, characteristic finite area that may be selected by the setup algorithm performed by the computer system shown in FIG. 1.

FIG. 2 is a block diagram of an exemplary, or illustrative, characteristic finite area 110 that may be selected by the setup algorithm. In the example illustrated in FIG. 2, the characteristic finite area 110 is a three-dimensional area having portions of DC conductor lines 111a and 111b in a first layer of silicon (not shown), portions of DC conductor lines 112a and 112b in a second layer of silicon (not shown) that is below the first layer of silicon, vias 113a and 113b electrically interconnecting DC conductor lines 111a and 112a and 111b and 112b, respectively, and a portion of an AC conductor line 114.

The AC conductor line 114 carries an electrical AC current that causes the AC conductor line 114 to exhibit Joule heating, i.e., to produce heat. The Joule heat produced by the AC conductor line 114 and its vias (not shown) of the area 110 creates a temperature rise in the DC conductor lines 111 and 112 and their vias 113a and 113b that can detrimentally affect the electromigration performance of the DC conductor lines 111 and 112 and of their vias 113a and 113b, respectively. The AC conductor line 114 and its vias (not shown) will be referred to collectively herein as the "AC conductor line configuration." Similarly, the DC conductor lines 111 and 112 and of their vias 113a and 113b, respectively, will be referred to collectively herein as the "DC conductor line configuration." The manner in which the amount of Joule heat produced by an AC conductor line of an IC design is calculated is well known. The manner in which the temperature rise of a DC conductor line configuration that is in close proximity to the AC conductor line configuration is calculated is also well known. Such calculations are made in accordance with Kirchhoff's Heat Conduction Equations, which are well known in the art of electro-thermal analysis. The calculations also take into account the heat dissipation characteristics of the silicon and conditions restricting heat transfer into adjacent cells. These concepts are well known to persons of skill in the art to which the invention pertains. Therefore, in the interest of brevity, the algorithms that are used to perform those calculations will not be described herein.

The setup element 20 executed by the processor subsystem 2 processes user input entered into the computer system 1 by a user through, for example, input devices 9 and/or 11, to select the characteristic finite area. However, the process of selecting the characteristic finite area could be fully automated so that user input would not be needed. Typically, a user who is experienced in IC design is able to determine from the design a suitable characteristic finite area. For example, the user may view the IC design or information extracted from the design on the display device 12 and select a finite area that has a DC conductor line configuration that repeats throughout the design and that also has a relatively large number of AC conductor lines and vias passing through it. The user will then select the finite area as the characteristic finite area using one of the input devices 9 or 11. The setup element 20 will then designate the selected finite area as the characteristic finite area. As indicated above, this process could instead be fully automated such that the setup element 20 would analyze the IC design and select a suitable finite area to be used as the characteristic finite area based on predetermined criteria, such as, for example, an area that has no more than one DC conductor line passing through it and that has the largest number of AC conductor lines and vias passing through it in the closest proximity to the DC conductor line.

Once the characteristic finite area has been selected, the setup element 20 determines the characteristic function for the characteristic finite area. As indicated above, the characteristic function is any function that relates the Joule heating power produced by the configuration of AC conductor line configuration of the characteristic finite area to the temperature rise of a victim DC conductor line configuration of the characteristic finite area. If there is more than one DC conductor line in the characteristic finite area, the setup element 20 will typically select the DC conductor line that exhibits the greatest temperature rise due to the Joule heating by the AC conductor line(s) as the victim DC conductor line.

Figure 3:
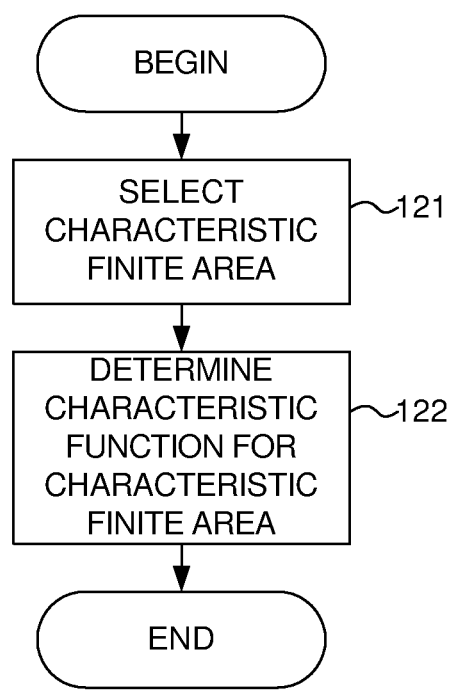
FIG. 3 is a flowchart that represents the setup algorithm performed by the setup element of the computer system shown in FIG. 1 in accordance with an illustrative embodiment.

FIG. 3 is a flowchart that represents the setup algorithm performed by the setup element 20 in accordance with an illustrative embodiment. Block 121 represents the setup element 20 selecting a finite area to be used as the characteristic finite area. After the characteristic finite area has been selected, the setup element 20 determines the characteristic function that will be used to express the temperature rise of the victim DC conductor line configuration of the characteristic finite area as a function of the Joule heating power produced by the AC conductor line(s) of the characteristic finite area. The process of determining the characteristic function is represented by block 122 in FIG. 3.

After the setup element 20 has selected the characteristic finite area and determined the characteristic function, the programmed processor system 100 executes the verification analysis element 30 that performs a verification analysis algorithm using the characteristic function determined by the setup element 20. Generally, this algorithm divides the IC design, or breaks the IC design down, into the actual finite areas having the same size, shape and DC conductor line configuration as the characteristic finite area. For each actual finite area, the algorithm calculates the Joule heating power of each AC conductor line configuration in the area and sums these powers to obtain a total Joule heating power. The algorithm then applies the total Joule heating power to the characteristic equation to obtain the temperature rise for the actual finite area. The algorithm then compares the temperature rise for the actual finite area with a predetermined threshold (TH) value. If the temperature rise exceeds the TH value, then the algorithm determines that the actual finite area does not pass verification. The algorithm will typically perform this process for each actual finite area in the design.

Figure 4:
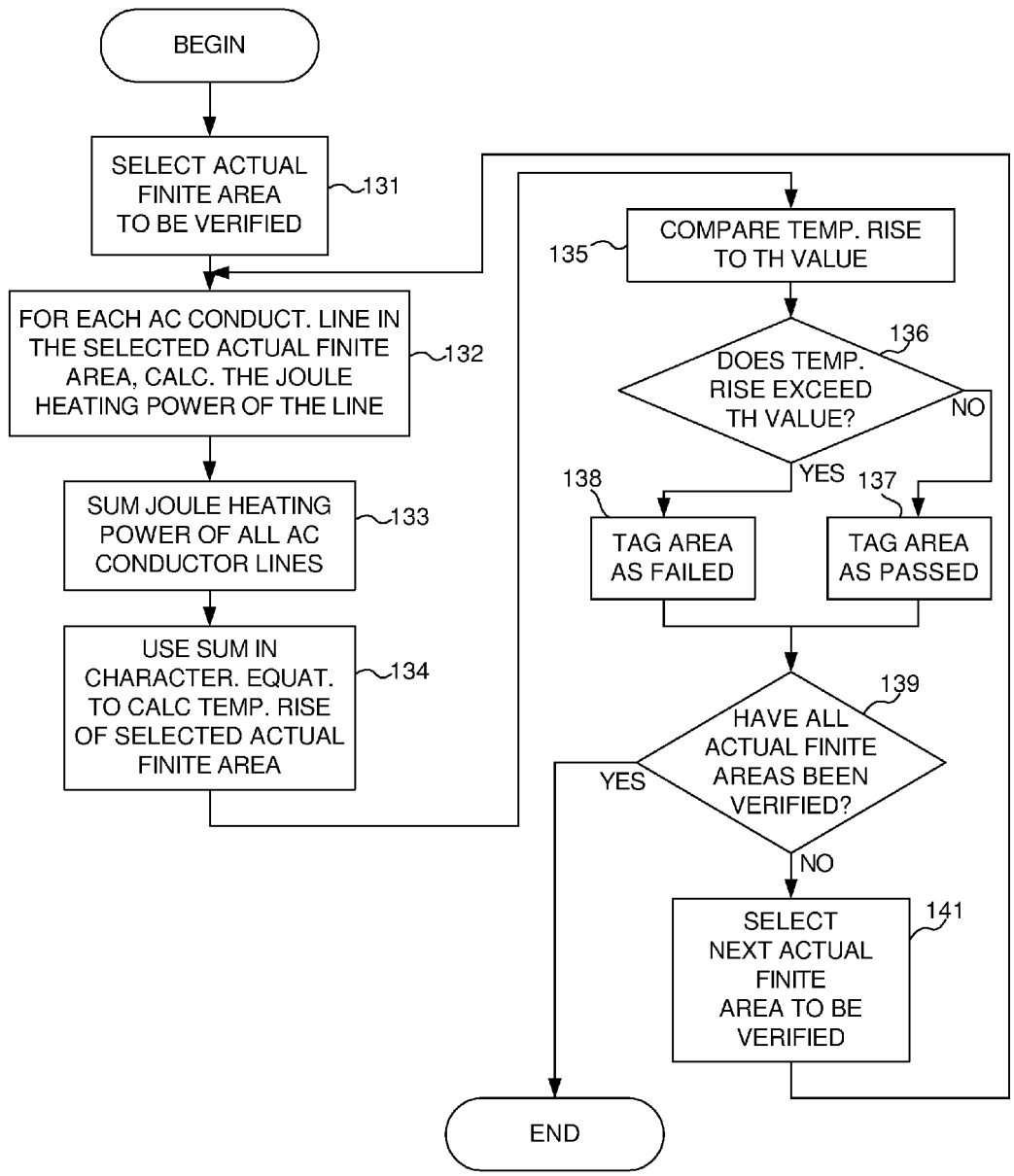
FIG. 4 is a flowchart that represents the method in accordance with an illustrative embodiment.

FIG. 4 is a flowchart that represents the method in accordance with an illustrative embodiment. The algorithm selects a first actual finite area in the IC design for verification analysis, as indicated by block 131. Each actual finite area will have a DC structure and silicon area that are the same as the DC structure and silicon area of the characteristic finite area. The term "DC structure," as that term is used herein, denotes the collection of DC conductor line configurations disposed in the finite area. The AC conductor line configuration of the actual finite areas typically will not be the same as the AC conductor line configuration of the characteristic finite area, which is typically a worst case AC conductor line configuration.

For each AC conductor line configuration, the Joule heating power of the line is calculated as $I^2R=P_{Line}$, where I is the AC current passing through the line, R is the resistance of the line, and $P_{Line}$ is the Joule heating power of the line. This step is represented by block 132. After the $P_{Line}$ has been calculated for all of the AC conductor lines of the selected actual finite area, all of the $P_{Line}$ values are summed together to obtain a total Joule heating power, $P_{Area\_Total}$, for the selected actual finite area, as indicated by block 133.

Once the total Joule heating power for the selected actual finite area has been calculated, this value is applied to the characteristic equation to calculate the temperature rise of the selected actual finite area, $\Delta T$. This step is represented by block 134. The temperature rise is then compared to a TH value, as indicated by block 135, and a determination is made as to whether or not the temperature rise exceeded the TH value, as indicated by block 136. If not, the selected actual finite area passed the verification analysis and is tagged as such, as indicated by block 137. If so, the selected actual finite area failed the verification analysis and is tagged as such, as indicated by block 138. It should be noted that one of blocks 137 and 138 can be eliminated such that the algorithm tags only areas that passed or only areas that failed.

After the selected actual finite area has been tagged as having passed or failed the verification analysis, a determination is made as to whether all of the actual finite areas in the IC design, or in the portion of the IC design of interest, have been verified, as indicated by block 139. If so, the process is complete. If not, the algorithm selects the next actual finite area to be analyzed, as indicated by block 141, and the process returns to block 132 and is repeated for the next selected actual finite area.

The information that is obtained by the verification analysis algorithm during the process represented by the flowchart of FIG. 4 may be used in a variety of ways. For example, if any one of the actual finite areas fails the verification analysis, the IC design may be deemed as having failed the verification analysis. Therefore, the process could be ended if any actual finite area fails the analysis, in which case it would not be necessary to perform the analysis for each and every actual finite area in the IC design (or in the portion of the IC design under consideration). Alternatively, the process could be performed for each and every actual finite area.

The algorithm represented by the flowchart shown in FIG. 4 may be the entire verification analysis element 30. In other words, the determination of whether the IC design passes or fails could be based solely on the results obtain from the algorithm represented by the flowchart shown in FIG. 4. Alternatively, for any actual finite area that failed the verification process, a subsequent verification analysis may be performed, as will now be described with reference to FIG. 5.

As indicated above, preferably the characteristic finite area is selected because it has a worst case AC conductor line Joule heating configuration and because it has a worst case temperature rise caused by the worst case Joule heating. This worst case scenario is reflected in the TH value that is used in the step represented by block 136. This is a very conservative approach because only actual finite areas that have a temperature rise that is the same or worse than the worst case temperature rise of the characteristic finite area will be tagged as having failed the verification analysis at block 137.

However, it may be possible in some cases that an actual finite area fails the analysis represented by the flowchart of FIG. 4, and yet does not actually present a problem in terms of electromigration performance. If actual finite areas that border a failed actual finite area do not exhibit large temperature rises due to Joule heating, the bordering, or neighboring, actual finite areas will absorb, or dissipate, some of the Joule heating produced by the AC conductor line configuration of the failed actual finite area. The heat dissipation by the neighboring actual finite areas can prevent the Joule heating in the failed actual finite area from resulting in a potential electromigration problem in the DC structure of the failed actual finite area.

Figure 5:
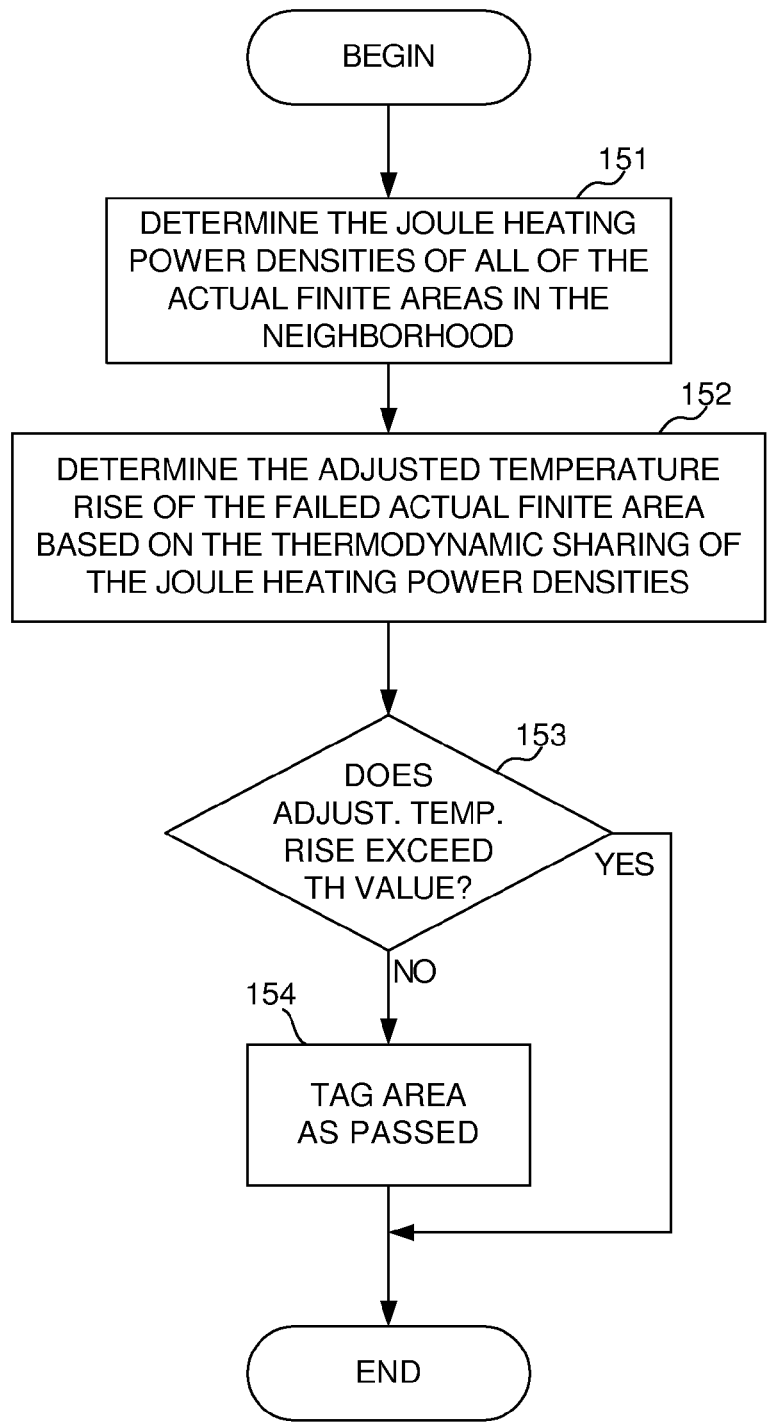
FIG. 5 is a flowchart that represents a subsequent verification analysis that may be performed by the verification analysis element shown in FIG. 1 after the method shown in FIG. 4 has been performed.
Figure 6A:
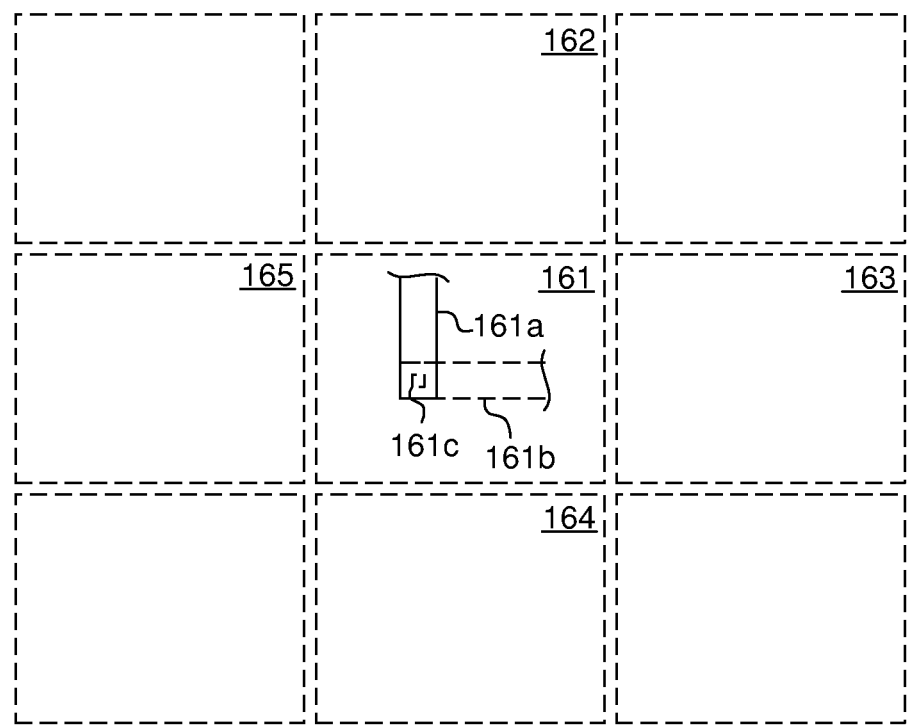
FIG. 6A is a block diagram illustrating an actual finite area that failed the analysis represented by the flowchart of FIG. 4 surrounded by four neighboring actual finite areas.

FIG. 5 is a flowchart that represents a subsequent verification analysis that may be performed by the verification analysis element 30 in such situations. For illustrative purposes, it will be assumed that the analysis represented by the flowchart of FIG. 5 is performed after the analysis represented by the flowchart of FIG. 4 has been performed, or at least after a determination has been made at block 136 that the temperature rise exceeded the TH value. FIG. 6A is a block diagram illustrating an actual finite area 161 that failed step 136 in FIG. 4 surrounded by four neighboring actual finite areas 162-165. For illustrative purposes, the failed actual finite area 161 has an AC conductor line configuration represented by AC conductor lines 161a and 161b and vias 161c, which interconnect conductor lines 161a and 161b. The subsequent verification analysis algorithm of FIG. 5 will be described with reference to FIGS. 5 and 6A.

The subsequent verification analysis algorithm adjusts the temperature rise of the failed actual finite area 161 by first determining the Joule heating power densities of it and all of the neighboring actual finite areas 162-165, as indicated by block 151. It should be noted that while four neighboring areas are used in this example, any number of neighboring areas could be used for this purpose. The term "neighboring areas," as that term is used herein, denotes areas that contiguously touch or abut the failed actual finite area. The algorithm applies the Joule heating power density values of the five actual finite areas of the example shown in FIG. 6A and determines an adjusted temperature rise, $\Delta_{T\_Adjusted}$, for the failed actual finite area 161 based on the thermodynamic sharing of the power densities of all of the actual finite areas 161-165. This step is represented by block 152 in FIG. 5. The determinations that are made by the algorithm are based on Kirchhoff's Heat Conduction Equations, which are well known in the art of electro-thermal analysis. Therefore, in the interest of brevity, a detailed discussion of the manner in which the algorithm performs those calculations will not be described herein.

The algorithm then compares the value of $\Delta_{T\_Adjusted}$ to a TH value, which may be the same TH value used in block 135 of FIG. 4. This comparison step is represented by block 153 in FIG. 5. If the value of $\Delta_{T\_Adjusted}$ does not exceed the TH value, the actual finite area that was previously tagged as having failed the verification process is now tagged as having passed the verification process, as indicated by block 154 in FIG. 5. If the value of $\Delta_{T\_Adjusted}$ does exceed the TH value, the actual finite area that was previously tagged as having failed the verification process remains tagged as a failing finite area.

The algorithm represented by the flowchart shown in FIG. 5 may be performed for every actual finite area that was tagged as a failing finite area during the algorithm represented by the flowchart of FIG. 4. Alternatively, the algorithm represented by the flowchart shown in FIG. 5 may be performed until the failure of a single actual finite area is re-verified by the process represented by of FIG. 5. Persons of skill in the art will understand that many modifications may be made to the algorithms represented by the flowcharts of FIGS. 4 and 5 while still achieving the goals of the invention.

The verification analysis element 30 may be configured to perform both of the algorithms described above with reference to the flowcharts of FIGS. 4 and 5, or it may be configured to only perform the algorithm represented by the flowchart of FIG. 4. The information that the verification analysis element 30 obtains through performing either or both of these algorithms may be used in many different ways to assess the electromigration performance of the IC design. For example, if the verification analysis element 30 determines at step 136 of FIG. 4 that an actual finite area has failed, this information may be conveyed to a user via the display device 12. The user may then initiate a redesign of the IC to change the entire IC design or only a specific portion of the IC design to correct the problem. However, it is possible that if only one or only a few failed areas are found, the problem may be deemed to be negligible, and therefore not require a redesign of the IC. In most cases, the detection of a failed finite area will result in the IC being redesigned, at least in the failed finite area.

Figure 6B:
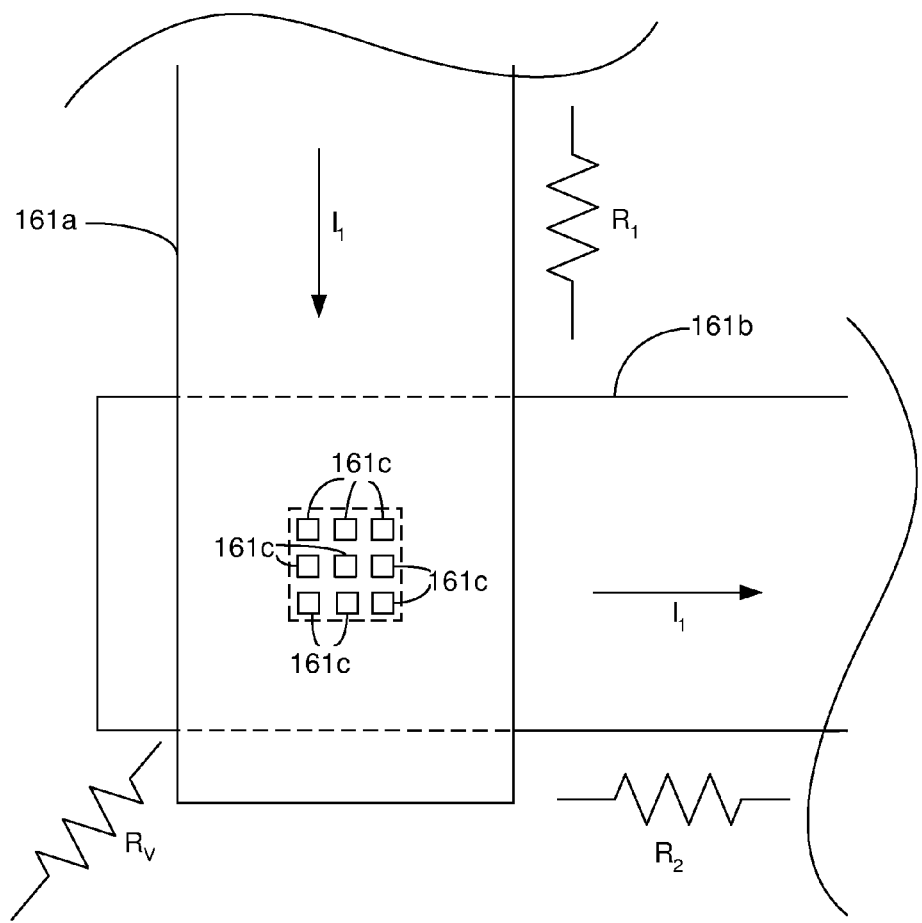
FIG. 6B illustrates an enlarged view of the area of the failed actual finite area shown in FIG. 6A.

There are other alternatives to the analysis of FIG. 5. The calculation of Joule heating power performed at step 132 in FIG. 4 is a very conservative calculation. An example of the manner in which this conservative calculation is performed and the manner in which a less conservative calculation is performed will now be described with reference to FIGS. 6A and 6B. FIG. 6B illustrates an enlarged view of the vias 161c shown in FIG. 6A. It will be assumed for this example that line 161a is in a first plane of silicon (not shown) and that line 161b is in a second plane (not shown) of silicon that is below the first plane with respect to the page that contains FIG. 6B. The interconnecting vias 161c extend in between the first and second planes.

During the process represented by block 132, the power calculation, $I^2R$ for each AC conductor line assumes that the electrical current, $I_1$, carried on the AC conductor lines 161a and 161b passes through each of the nine vias 161c. Therefore, the power calculation for the AC conductor line configuration of finite area 161 can be expressed as:

$$I_1^2 R_1 + (I_1^2 R_v) \times 9 + I_1^2 R_2 = P_T, \quad \text{(Equation 1)}$$

where $I_1$ is the electrical current carried on conductor lines 161a and 161b, $R_1$ is the resistance of conductor line 161a, $R_2$ is the resistance for conductor line 161b, and $R_v$ is the equivalent resistance of the via area 161c. However, the current $I_1$ is actually evenly split among the nine vias 161c. Therefore, a more accurate power calculation is:

$$I_1^2 R_1 + (I_1/9)^2 R_v \times 9 + I_1^2 R_2 = P_T \quad \text{(Equation 2)}$$

Using Equation 2 results in a lower value for $P_T$ than the value of $P_T$ that is obtained using Equation 1. Thus, Equation 2 provides a less conservative calculation for $P_T$ and will result in a lower, and more accurate, value for $P_T$. The temperature rise that is then calculated using the lower, more accurate value of $P_T$ will also be lower, and therefore will be less likely to exceed the TH value.

Figure 7:
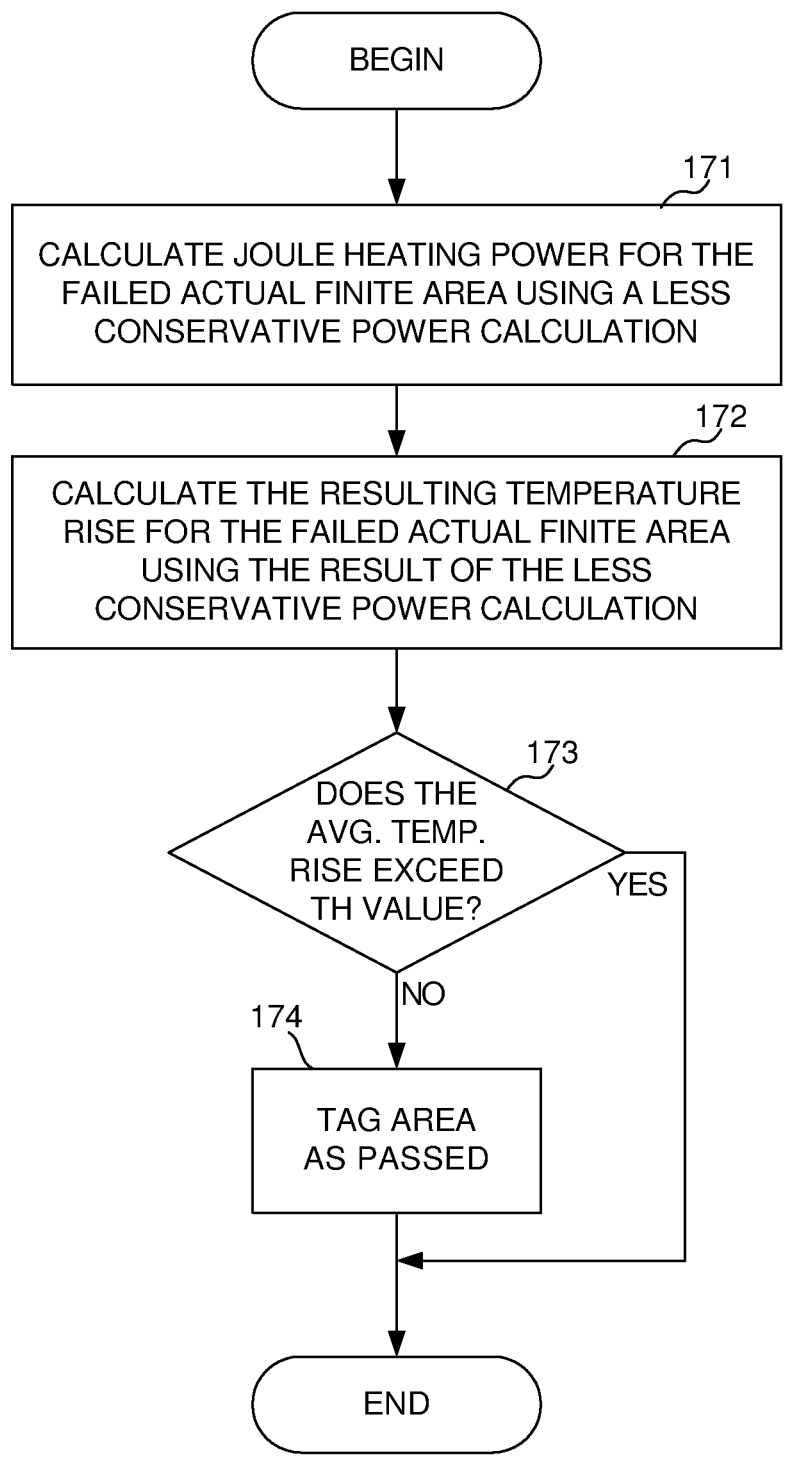
FIG. 7 illustrates a flowchart that represents a subsequent verification algorithm that is performed after a determination has been made by the process represented by the flowchart of FIG. 4 that a finite area failed the verification analysis.

One alternative to using the average temperature rise described above with reference to FIG. 5 is to use the less conservative $P_T$ calculation of Equation 2 to determine the Joule heating power for the actual finite area that has been tagged as failing the verification analysis, as will now be described with reference to FIG. 7. FIG. 7 illustrates a flowchart that represents a subsequent verification algorithm that is performed after a determination has been made at block 136 of FIG. 4 that an actual finite area failed the verification analysis. For each AC conductor line of the failed actual finite area, the Joule heating power, $P_T$, is calculated using Equation 2, and the $P_T$ values are summed together, as indicated by block 171. The temperature rise for the failed actual finite area is then calculated using the sum of the $P_T$ values obtained at block 171, as indicated by block 172. The temperature rise is then compared to the TH value, as indicated by block 173. If it is determined at block 173 that the temperature rise does not exceed the TH value, then the failed actual finite area is tagged as passing, as indicated by block 174. Otherwise, the finite area remains tagged as failing.

Another alternative to the processes described above with reference to FIGS. 5 and 7 is to use more accurate current values for the segments that make up the AC conductor line configurations rather than using worst case current values. Using the more accurate current values results in a more accurate, and also the less conservative, Joule heating power calculation for the actual finite area that has been tagged as failing the verification analysis. The temperature rise for the failed actual finite area is then calculated based on the more accurate Joule heating power calculation, resulting in a more accurate, and also less conservative, temperature rise value. This temperature rise value is then compared to the TH value to determine whether the actual finite area should remain tagged as failing.

By using the setup and verification analysis algorithms of the invention described above with reference to illustrative embodiments, the IC design can be checked quickly and efficiently to determine whether any area in the IC design may produce a temperature rise that may present an electromigration problem. The analysis is much more robust and accurate than the known simple thermal analysis and much more efficient and practical than a full three-dimensional thermal analysis, which, as stated above, is generally an intractable approach.

It should be noted that the invention has been described with reference to a few illustrative embodiments for the purpose of demonstrating the principles and concepts of the invention. Persons skilled in the art will understand, however, that the invention is not limited to the illustrative embodiments described herein, and that many variations may be made to the embodiments described herein without deviating from the principles and concepts of the invention. All such variations are within the scope of the invention, as will be understood by persons of skill in the art in view of the description provided herein.

What is claimed is:

1. A computer system for analyzing an integrated circuit (IC) design to determine whether a temperature rise caused by Joule heating in alternating current (AC) conductor lines is acceptable, the system comprising:
    a user interface;
    a memory subsystem that stores a representation of at least a portion of the IC design and computer code for performing a verification analysis; and
    a processor subsystem, the processor subsystem programmed to:
        select a characteristic finite area in said representation, the selected characteristic finite area corresponding to an area having a particular shape and size and having a particular direct current (DC) conductor line configuration that is repeated throughout said representation;
        compute a characteristic function for the selected characteristic finite area, the characteristic function characterizing a temperature rise of the selected characteristic finite area as a function of Joule heating power produced by an alternating current (AC) conductor line configuration of the selected characteristic finite area;
        for each actual finite area in said representation that has a size and shape and a DC conductor line configuration that matches the size and shape and DC conductor line configuration of the selected characteristic finite area:
            calculate a total Joule heating power of the AC conductor line configuration of the actual finite area,
            apply the respective total Joule heating power of each respective actual finite area to said characteristic function to calculate a respective temperature rise value for each respective actual finite area, and
            compare each respective temperature rise value with a predetermined threshold (TH) value to determine whether the respective temperature rise value exceeds the TH value.

2. The computer system of claim 1, wherein if the respective temperature rise value of a respective actual finite area exceeds the TH value, the respective actual finite area is tagged as failing the verification analysis.

3. The computer system of claim 1, wherein if the respective temperature rise value of a respective actual finite area does not exceed the TH value, the respective actual finite area is tagged as passing the verification analysis.

4. The computer system of claim 1, wherein if the respective temperature rise value of a respective actual finite area exceeds the TH value, the respective actual finite area is deemed to have failed the verification analysis.

5. The computer system of claim 1, wherein if the respective temperature rise value of a respective actual finite area exceeds the TH value, the respective actual finite area is further analyzed in a subsequent verification process that more accurately determines the Joule heating power and the temperature rise value of the respective AC conductor configuration and determines whether the more accurately determined temperature rise value exceeds the TH value.

6. The computer system of claim 1, wherein if the respective temperature rise value of a respective actual finite area exceeds the TH value, then the respective actual finite area is deemed a failed actual finite area and a subsequent verification process is performed that obtains an adjusted temperature rise value for the failed actual finite area based on an analysis of sharing of Joule power heating densities among the failed actual finite area and neighboring actual finite areas that border the failed actual finite area and compares the adjusted temperature rise value with the TH value to determine whether the adjusted temperature rise value exceeds the TH value.

7. The computer system of claim 1, further comprises:
a user input device connected to the user interface, wherein the selected characteristic finite area is selected at least partly based on a user input that is inputted into the computer system via the user input device.

8. The computer system of claim 1, wherein the computer system further comprises:
a display device connected to the user interface, and wherein the determination of whether the respective temperature rise value exceeds the TH value is displayed on the display device.

9. The computer system of claim 1, wherein the characteristic function is a linear function.

10. The computer system of claim 1, wherein the characteristic function is a nonlinear function.

11. The computer system of claim 9, wherein the linear function is a scalar.

12. A method for analyzing an integrated circuit (IC) design in a computer system to determine whether a temperature rise caused by Joule heating in alternating current (AC) conductor lines is acceptable, the method comprising:
in a memory subsystem of the computer system, storing a representation of at least a portion of the IC design and computer code for performing a verification analysis; and
in a processor subsystem of the computer system:
selecting a characteristic finite area in said representation, the selected characteristic finite area corresponding to an area having a particular shape and size and having a particular direct current (DC) line conductor configuration that is repeated throughout said representation;
computing a characteristic function for the selected characteristic finite area, the characteristic function characterizing a temperature rise of the selected characteristic finite area as a function of Joule heating power produced by an alternating current (AC) conductor line configuration of the selected characteristic finite area;
for each actual finite area in said representation that has a size and shape and a DC conductor line configuration that matches the size and shape and DC conductor line structure of the selected characteristic finite area:
calculating a total Joule heating power of the AC conductor line configuration of the actual finite area,
applying the respective total Joule heating power of the respective actual finite area to said characteristic function to calculate a respective temperature rise value for the respective actual finite area, and
comparing the respective temperature rise value with a predetermined threshold (TH) value to determine whether the respective temperature rise value exceeds the TH value.

13. The method of claim 12, further comprising:
if the respective temperature rise value of a respective actual finite area exceeds the TH value, tagging the respective actual finite area as failing the verification analysis.

14. The method of claim 12, further comprising:
if the respective temperature rise value of a respective actual finite area does not exceed the TH value, tagging the respective actual finite area as passing the verification analysis.

15. The method of claim 12, wherein if the respective temperature rise value of a respective actual finite area exceeds the TH value, the respective actual finite area is deemed to have failed the verification analysis.

16. The method of claim 12, further comprising:
if the respective temperature rise value of a respective actual finite area exceeds the TH value, further analyzing the respective actual finite area in a subsequent verification process that more accurately determines the Joule heating power and the temperature rise value of the respective AC conductor line configuration to determine whether the more accurately determined temperature rise value exceeds the TH value.

17. The method of claim 12, further comprising:
if the respective temperature rise value of a respective actual finite area exceeds the TH value, then the respective actual finite area is deemed a failed actual finite area and the respective failed actual finite area is further analyzed in a subsequent verification process that obtains an adjusted temperature rise value for the failed actual finite area based on an analysis of sharing of Joule power heating densities among the failed actual finite area and neighboring actual finite areas that border the failed actual finite area and compares the adjusted temperature rise value with the TH value to determine whether the adjusted temperature rise value exceeds the TH value.

18. The method of claim 12, further comprising:
with a user input device connected to a user interface of the computer system, entering a user input to the computer system, wherein the selected characteristic finite area is selected at least partly based on the user input.

19. The method of claim 12, wherein the computer system further comprises:
on a display device connected to a user interface of the computer system, displaying the determination of whether the respective temperature rise value exceeds the TH value.

20. The method of claim 12, wherein the characteristic function is a linear function.

21. The method of claim 12, wherein the characteristic function is a nonlinear function.

22. The method of claim 20, wherein the linear function is a scalar.

23. A computer program for analyzing an integrated circuit (IC) design in a computer system to determine whether a temperature rise caused by Joule heating in alternating current (AC) conductor lines of the IC design is acceptable, the computer program comprising computer instructions stored on a non-transitory computer-usable medium, the computer instructions comprising:
computer instructions for selecting a characteristic finite area in a representation of at least a portion of the IC design to be used as a characteristic finite area in a verification analysis, the selected characteristic finite area corresponding to an area having a particular shape and size and having a particular direct current (DC) conductor line configuration that is repeated throughout said representation;

computer instructions for computing a characteristic function for the selected characteristic finite area, the characteristic function characterizing a temperature rise of the selected characteristic finite area as a function of Joule heating power produced by an alternating current (AC) conductor line configuration of the selected characteristic finite area;

computer instructions for analyzing each actual finite area in said representation that has a size and shape and a DC conductor line configuration that matches the size and shape and DC conductor line configuration of the selected characteristic finite area by:
- calculating a total Joule heating power of the AC conductor line configuration of the actual finite area,
- applying the respective total Joule heating power of the respective actual finite area to said characteristic function to calculate a respective temperature rise value for the respective actual finite area, and
- comparing the respective temperature rise value with a predetermined threshold (TH) value to determine whether the respective temperature rise value exceeds the TH value.

24. The computer program of claim 23, further comprising: computer instructions for tagging the respective actual finite area as failing the verification analysis if the respective temperature rise value of the respective actual finite area exceeds the TH value.

25. The computer program of claim 23, further comprising: computer instructions for tagging the respective actual finite area as passing the verification analysis if the respective temperature rise value of the respective actual finite area does not exceed the TH value.

26. The computer program of claim 23, further comprising: computer instructions for further analyzing the respective actual finite area in a subsequent verification process if the respective temperature rise value of the respective actual finite area exceeds the TH value, wherein the subsequent verification process more accurately determines the Joule heating power and the temperature rise value of the respective AC conductor line configuration of the respective actual finite area to determine whether the more accurately determined temperature rise value exceeds the TH value.

27. The computer program of claim 23, further comprising: computer instructions for further analyzing the respective actual finite area in a subsequent verification process if the respective temperature rise value of the respective actual finite area exceeds the TH value, wherein if the respective temperature rise value of the respective actual finite area exceeds the TH value, the respective actual finite area is deemed a failed actual finite area, and wherein the subsequent verification process obtains an adjusted temperature rise value for the failed actual finite area based on an analysis of sharing of Joule power heating densities among the failed actual finite area and neighboring actual finite areas that border the failed actual finite area and compares the adjusted temperature rise value with the TH value to determine whether the adjusted temperature rise value exceeds the TH value.

28. The computer program of claim 23, further comprising: computer instructions for processing a user input that has been inputted into the computer system via a user input device connected to a user interface of the computer system, wherein the selected characteristic finite area is selected at least partly based on the user input.

29. The computer program of claim 23, further comprising: computer instructions for causing the determination of whether the respective temperature rise value exceeds the TH value to be displayed on a display device connected to a user interface of the computer system.

30. The computer program of claim 23, wherein the characteristic function is a linear function.

31. The computer program of claim 23, wherein the characteristic function is a nonlinear function.

32. The computer program of claim 30, wherein the linear function is a scalar.

* * * * *